(12) United States Patent
Makimura et al.

(10) Patent No.: US 7,772,783 B2
(45) Date of Patent: Aug. 10, 2010

(54) DIMMABLE ELECTRONIC BALLAST FOR ELECTRODELESS DISCHARGE LAMP AND LUMINAIRE

(75) Inventors: Shinji Makimura, Kitakatsuragi-gun (JP); Hiroshi Kido, Hirakata (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 332 days.

(21) Appl. No.: 12/067,287

(22) PCT Filed: Sep. 28, 2005

(86) PCT No.: PCT/JP2005/017818

§ 371 (c)(1),
(2), (4) Date: Mar. 18, 2008

(87) PCT Pub. No.: WO2007/036995

PCT Pub. Date: Apr. 5, 2007

(65) Prior Publication Data

US 2009/0278467 A1 Nov. 12, 2009

(51) Int. Cl.
H05B 41/24 (2006.01)
(52) U.S. Cl. .................. 315/248; 315/291; 315/360; 315/209 R; 315/308; 315/DIG. 4
(58) Field of Classification Search ............ 315/209 R, 315/219, 246–248, 291, 224, 244, 307, 308, 315/360, 36, DIG. 4, DIG. 5, DIG. 72
See application file for complete search history.

(56) References Cited

U.S. PATENT DOCUMENTS 6,642,671 B2 * 11/2003 Kurachi et al. .............. 315/248

7,279,840 B2 * 10/2007 Chandler et al. ............ 313/634
7,339,329 B2 * 3/2008 Makimura et al. .......... 315/248
7,365,498 B2 * 4/2008 Makimura et al. .......... 315/219

FOREIGN PATENT DOCUMENTS

| EP | 0 604 133 A2 | 6/1994 |
| JP | 2000-353600 A | 12/2000 |
| JP | 2003-515898 A | 5/2003 |
| JP | 2004-247201 A | 9/2004 |
| JP | 2005-135641 A | 5/2005 |
| JP | 2005-158459 A | 6/2005 |
| WO | WO-01/41515 A1 | 6/2001 |
| WO | WO-2004/073360 A1 | 8/2004 |

OTHER PUBLICATIONS

Supplementary European Search Report for the Application No. EP 05 78 8367 dated Oct. 14, 2009.
International Search Report for the Application No. PCT/JP2005/017818 dated Oct. 25, 2005.

* cited by examiner

Primary Examiner—Haissa Philogene
(74) Attorney, Agent, or Firm—Cheng Law Group, PLLC (57) ABSTRACT

A dimmable electronic ballast for an electrodeless discharge lamp comprises an inverter circuit, a resonance circuit, an induction coil and a start circuit. The start circuit has a variable time constant. The start circuit sweeps a drive frequency of the inverter circuit through a time constant for start or restart so that the voltage applied across the coil is raised from voltage lower than start voltage and restart voltage for starting and restarting the lamp to voltage higher than the start voltage and the restart voltage. The time constant for start during a start period for starting the lamp is larger than the time constant for restart during a restart period for restarting the lamp.

9 Claims, 10 Drawing Sheets

DIMMABLE ELECTRONIC BALLAST FOR ELECTRODELESS DISCHARGE LAMP AND LUMINAIRE

TECHNICAL FIELD

The invention relates to a dimmable electronic ballast for an electrodeless discharge lamp and luminaire equipped with the ballast.

BACKGROUND ART

Dimming in a dimmable electronic ballast for an electrodeless discharge lamp is realized by the repetition of turning the lamp on and off in the same way as, for example, the circuit described in Japanese Patent Application Publication Number 2000-353600. In such a circuit, each of lamp turn on and off periods is set to a short period of time (e.g., a few ms or less) in which brightness change by the lamp is not perceived by the human eyes. In the circuit, each lamp turn off period is set to approximately 0.5 ms.

This sort of ballast is made up of, for example, a DC power supply circuit, an inverter circuit, a resonance circuit and an induction coil. In addition, the ballast is further provided with a start circuit for sweeping up the start voltage applied across the coil in order to start an electrodeless discharge lamp successfully and stably.

In that sweep-up type ballast, the start voltage swept up during a start period becomes very high owing to the time constant of the start circuit. Because restart voltage must be raised up to voltage required to restart the lamp immediately after a short period of lamp turn off, and also the start period is longer than the restart period.

When the ballast is further provided with a ferrite core like, e.g., the system described in Japanese Patent National Publication Number P2003-515898A (WO01/041515), if ambient temperature is high, it easily saturates the ferrite core during a start period.

DISCLOSURE OF THE INVENTION

It is therefore an object of the present invention to lower start voltage without lowering restart voltage, and also, even if a ferrite core is installed, to hardly saturate the ferrite core during a start period.

A dimmable electronic ballast for an electrodeless discharge lamp of the present invention comprises an inverter circuit, a resonance circuit, an induction coil and a start circuit. In response to a drive signal having a variable drive frequency the inverter circuit converts the DC power from a DC power supply circuit into the high-frequency power having the operation frequency corresponding to the drive frequency. The resonance circuit receives the high-frequency power and then produces high-frequency resonant power based on a resonance characteristic. The resonant power is variable output corresponding to the operation frequency. The induction coil receives the high-frequency resonant power and then generates a high-frequency electromagnetic field to apply the electromagnetic field to the electrodeless discharge lamp. The start circuit has a variable time constant. The start circuit sweeps the drive frequency through a time constant for start or restart so that the voltage applied across the coil by the high-frequency resonant power is raised from voltage lower than start voltage and restart voltage for starting and restarting the lamp to voltage higher than the start voltage and the restart voltage. The time constant for start during a start period for starting the lamp at the beginning of dimming is larger than the time constant for restart during a restart period for restarting the lamp in the dimming period.

In this construction, during each restart period, the voltage applied across the coil can be quickly raised through the time constant for restart, and therefore the lamp can be quickly restarted and then turned on. Moreover, it is possible to reduce stress on circuits, because the rise of the voltage applied the coil during the start period can be made gentle through the time constant for start and also the voltage (maximum voltage) at the time of start can be decreased. Therefore, the start voltage can be lowered without lowering the restart voltage. In addition, even if a ferrite core is installed, the ferrite core can be hardly saturated during a start period.

In a preferred embodiment, the start circuit receives a dimming control signal that is variable in duty and repeats first and second levels. In response to each first level, the start circuit periodically sweeps the drive frequency through the time constant for restart so that the voltage applied across the coil is raised from the voltage lower than the restart voltage to the voltage higher than the restart voltage. The lamp is repeatedly turned on and off in accordance with the dimming control signal, and is lit at the dimming rate corresponding to the duty.

In another preferred embodiment, the start circuit periodically changes the drive frequency to a frequency for extinction during each second level of the dimming control signal. The frequency for extinction is a frequency for lowering the voltage applied across the coil to voltage lower than voltage necessary to light the lamp. However, not limited to this, the inverter circuit may periodically stop the output of itself during each second level of the dimming control signal.

In an enhanced embodiment, the start circuit continuously sweeps down the time constant for start and the time constant for restart. In this embodiment, the components of overshoot and undershoot are excluded and accordingly the restart voltage can be prevented from becoming excessive owing to such components.

In another enhanced embodiment, the start circuit is connected with a control signal generation device. The control signal generation device supplies the dimming control signal to the start circuit, and also increases duty of each second level of the dimming control signal from the output time point of the dimming control signal. The duty is increased from zero to a given value. In case of this embodiment, the overvoltage generation caused by change of the time constant can be prevented.

In other enhanced embodiment, the start circuit is connected with a control signal generation device. The control signal generation device supplies the dimming control signal to the start circuit before a time of 50 ms passes from a point in time at which the resonance characteristic of the lamp shifts to the resonance of a lighting mode. In case of this embodiment, a flicker feel after a start period can be suppressed.

In other preferred embodiment, a first operation frequency immediately before sweeping in the start period is lower than a second operation frequency immediately before sweeping in the restart period. The voltage applied across the coil by the first operation frequency is also higher than the voltage applied across the coil by the second operation frequency. In case of this embodiment, the start voltage can be further decreased and also a start period can be shortened. Furthermore, the saturation of a ferrite core can be more effectively prevented.

Luminaire of the present invention comprises said dimmable electronic ballast, and is equipped with the lamp.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
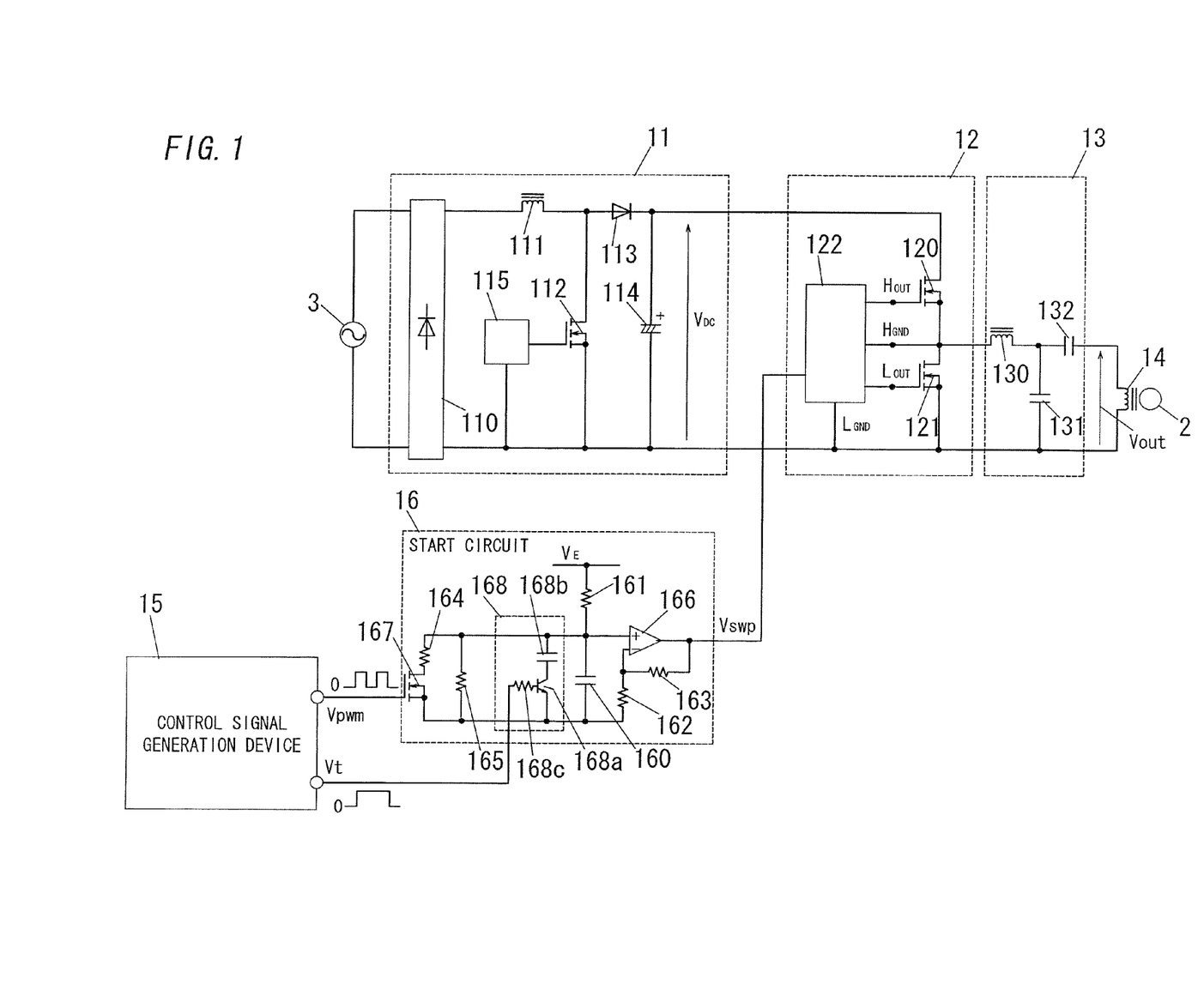
FIG. 1 is a circuit diagram of a first embodiment of a dimmable electronic ballast for an electrodeless discharge lamp according to the present invention.
Figure 2:
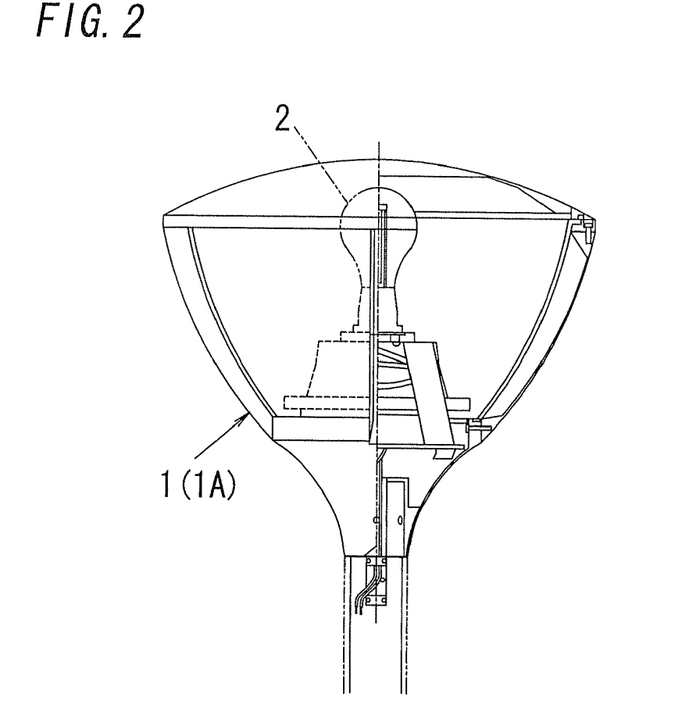
FIG. 2 illustrates luminaire equipped with the ballast of FIG. 1.
Figure 3:
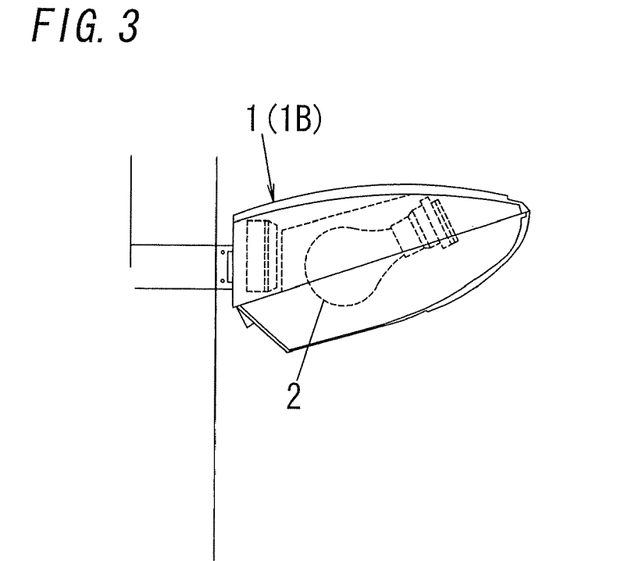
FIG. 3 shows another example of luminaire equipped with the ballast of FIG. 1.

FIG. 1 shows a first embodiment of a dimmable electronic ballast for an electrodeless discharge lamp according to the present invention. The ballast in the first embodiment is installed to luminaire 1 such as, for example, a street lamp 1A of FIG. 2, a protective lamp 1B of FIG. 3, a downlight or the like. The luminaire 1 is equipped with an electrodeless discharge lamp 2. The lamp 2 has a bulb such as a glass bulb, a glass sphere or the like, filled with a discharge gas such as inert gas, metal vapor and so on (e.g., mercury and rare gas). The bulb is transparent or includes phosphor applied to the inner surface.

As shown in FIG. 1, the ballast is formed of a DC power supply circuit 11, an inverter circuit 12, a resonance circuit 13, an induction coil 14, a control signal generation device 15 and a start circuit (control circuit) 16. However, the device 15 may be an external device.

The DC power supply circuit 11 is, for example, a voltage step up converter and converts the AC power from an AC power source 3 into DC power, i.e., DC voltage VDC. The converter is formed of, for example, a rectifier (diode bridge) 110, an inductor 111, an FET 112, a diode 113, a smooth capacitor 114 and a control circuit 115.

The inverter circuit 12 is, for example, a half bridge inverter. In response to a drive signal having a variable drive frequency the inverter converts the DC power from the DC power supply circuit 11 into the high-frequency power having the operation frequency (e.g., tens kHz to tens MHz) corresponding to the drive frequency. The inverter is made up of FETs 120 and 121, and a drive circuit 122.

Figure 4:
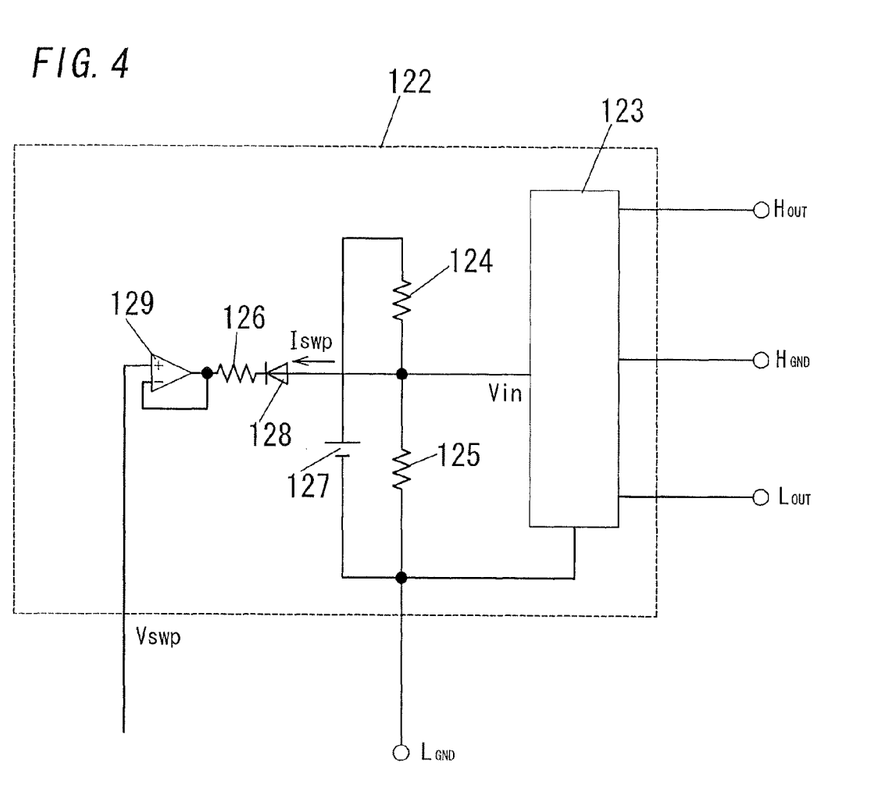
FIG. 4 is a circuit diagram of a drive circuit in the ballast of FIG. 1.

As shown in an example of FIG. 4, the drive circuit 122 is formed of a voltage controlled oscillator (VCO) 123, resistors 124-126, a constant voltage source 127, a diode 128 and a follower amp 129. The drive circuit supplies each gate of the FETs 120 and 121 with the drive signal such as square waves or the like. Both of the drive signals have the phase difference of approximately 180°, and are applied across terminals $H_{OUT}$ and $H_{GND}$ and terminals $L_{OUT}$ and $L_{GND}$. Accordingly, FETs 120 and 121 are alternately turned on and off through the drive signals.

Figure 5:
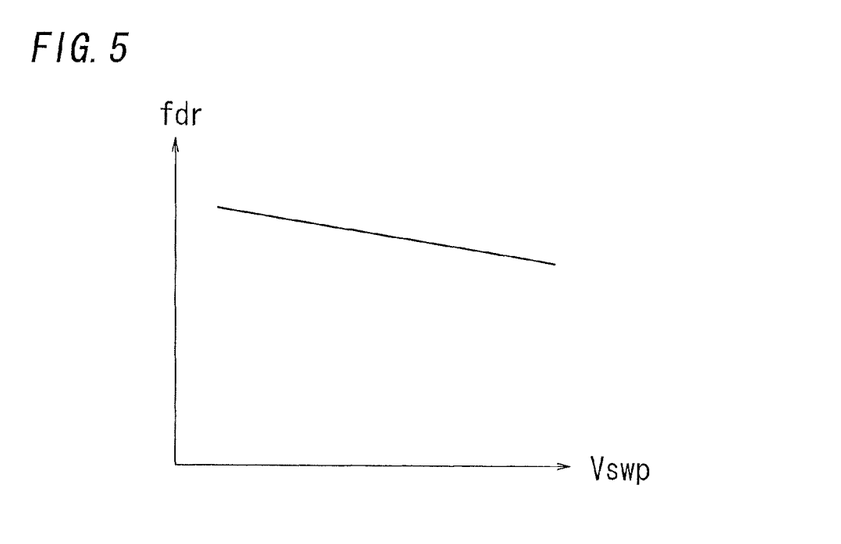
FIG. 5 is an input/output characteristic curve of the drive circuit of FIG. 4.

The drive circuit 122 also controls each drive frequency of the drive signals in accordance with a drive control signal (voltage) $V_{swp}$ from the start circuit 16. A basic frequency of the drive frequency is determined by the constant voltage source 127 and the resistors 124 and 125. The basic component of input voltage $V_{in}$ to the VCO 123 is the voltage (divided voltage) obtained by dividing the voltage of the constant voltage source 127 by the resistors 124 and 125. The (electric) current $I_{swp}$ drawn from the division (coupling) point of the resistors 124 and 125 decreases and increases in response to increase and decrease of the signal $V_{swp}$, respectively. The voltage $V_{in}$ increases and decreases in response to decrease and increase of the current $I_{swp}$, respectively. The VCO 123 then decreases and increases each drive frequency $f_{dr}$ of the drive signals in response to the increase and decrease of the voltage $V_{in}$, respectively. Therefore, as shown in FIG. 5, the circuit 122 decreases and increases each drive frequency $f_{dr}$ of the drive signals in accordance with the increase and decrease of the drive control signal $V_{swp}$ respectively.

Figure 6:
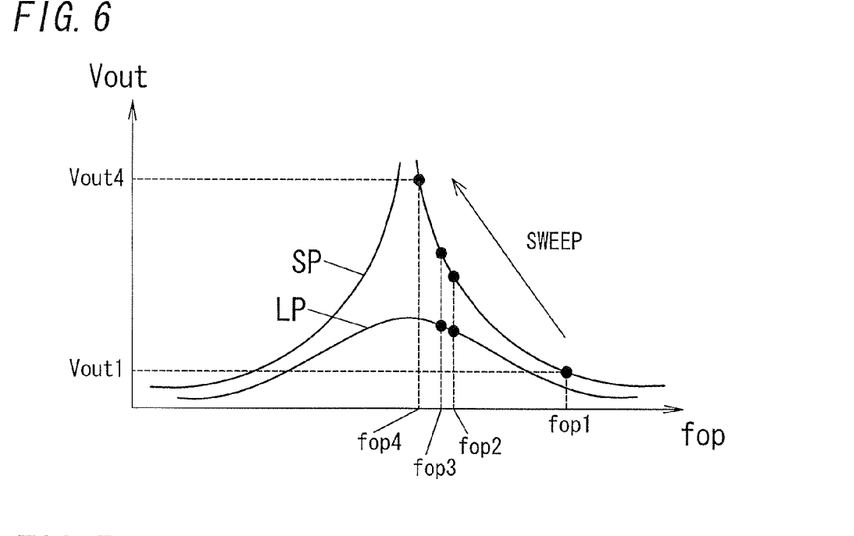
FIG. 6 is a resonant characteristic curve of the ballast of FIG. 1.

The resonance circuit 13 of FIG. 1 is, for example, a series resonance circuit formed of an inductor 130 and a capacitor 131. The resonance circuit receives the high-frequency power from the inverter circuit 12 and then produces high-frequency resonant power based on a resonance characteristic. The resonant power is variable output corresponding to the operation frequency of the circuit 12. As shown in FIG. 6, the resonance characteristic shifts to a first resonance curve SP and a second resonance curve LP in response to the extinguishing and lighting states of the lamp 2, respectively. The curve SP is the characteristic of a start period (a start mode) before the lamp 2 is lit, and has a resonant peak at a particular resonant frequency. The curve LP is the characteristic of a lighting period (a lighting mode) while the lamp 2 is lit, and is lower than the first resonance curve SP. The capacitor 132 of FIG. 1 is combined with the capacitor 131 to constitute a matching circuit.

The induction coil 14 is connected to the output of the resonance circuit 13 and also located in the proximity of the lamp 2. The coil 14 receives the high-frequency resonant power from the circuit 13 and then generates a high-frequency electromagnetic field to apply the electromagnetic field to the lamp 2. The coil 14 is also provided with a ferrite core.

The control signal generation device 15 supplies the start circuit 16 with a composite control signal $V_{pwm}$ including start and dimming control signals, and also supplies the circuit 16 with a time constant change signal $V_t$. The signal $V_t$ is turned HIGH during a given period from a start time point, and is turned LOW after the period. Adjustment of a dimming rate is realized by controlling ON duty of the dimming control signal included in the composite control signal $V_{pwm}$.

The start circuit 16 is a sweep circuit having a variable time constant. As shown in FIGS. 5 and 6, the circuit 16 sweeps down the drive frequency $f_{op}$ through a time constant for start or restart so that the voltage $V_{out}$ applied across the coil 14 by the high-frequency resonant power is raised from voltage lower than start voltage and restart voltage for starting and restarting the lamp 2 (see $V_{out1}$ in FIG. 8) to voltage higher than the start voltage and restart voltage.

As shown in FIG. 1, the start circuit 16 is formed of a capacitor 160, resistors 161-165, an OP amp 166, a FET 167 and a time constant change circuit 168. The capacitor 160 and the resistor 161 constitute an integral circuit having a basic time constant, and are applied with DC voltage $V_E$. The OP amp 166 and the resistors 162 and 163 constitute a non-inverting amplifier, and amplify the output of the integral circuit. The FET 167 and the resistor 164 (resistor 164<resistor 165) constitute a discharge circuit. The discharge circuit discharges an electric charge of the capacitor 160 during turn-on of the FET 167 at each HIGH of the composite control signal $V_{pwm}$. The resistors 161, 164 and 165 determine the minimum output voltage (minimum voltage of $V_{swp}$) of the non-inverting amplifier when FET 167 is turned on, and then defines a sweep start frequency of the drive frequency $f_{dr}$. Accordingly, the maximum operation frequency $f_{op1}$ at the time of start and extinction is defined as shown in FIG. 6. The frequency $f_{op1}$ is set to a value that losses in the inverter circuit 12, the coil 14 and so on become few. On the other hand, the maximum voltage across the capacitor 160 determines the maximum output voltage of the non-inverting amplifier to define the sweep end frequency of the frequency $f_{dr}$. Accordingly, the minimum operation frequency $f_{op4}$ is defined, and the lamp 2 is lit when the operation frequency $f_{op}$ is sweeping down from $f_{op1}$ to $f_{op4}$. In FIG. 6, $f_{op3}$ is the operation frequency when the lamp 2 is lit in the start period, and $f_{op2}$ is the operation frequency when the lamp 2 is lit in the restart period.

Figure 7:
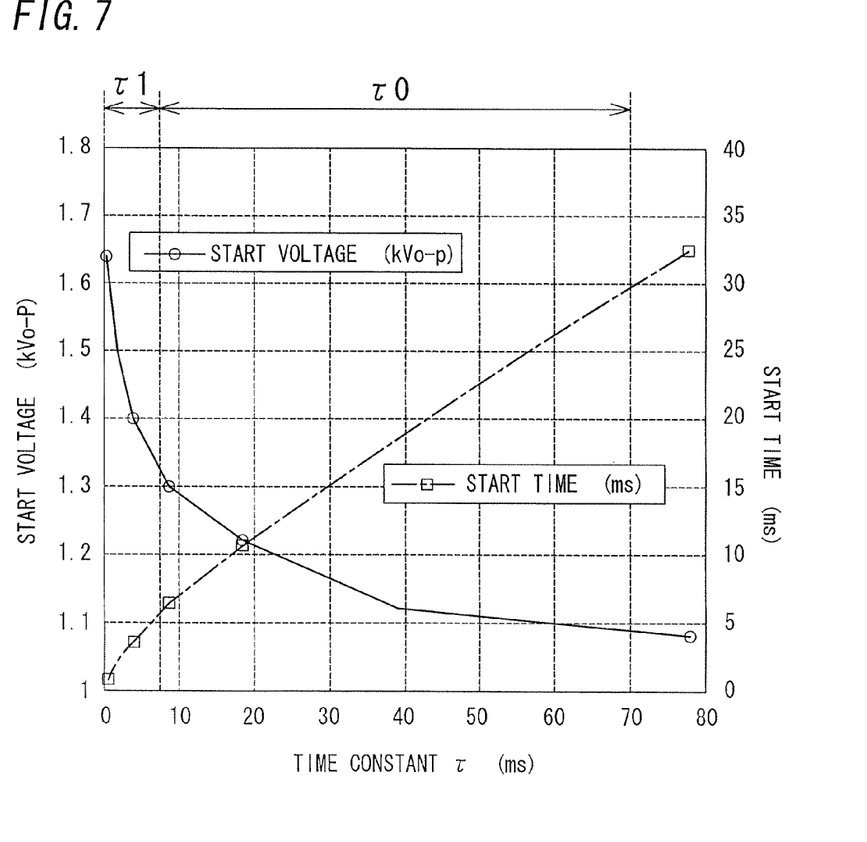
FIG. 7 shows an operational principle of a time constant change circuit in the ballast of FIG. 1.

As shown in FIG. 7, the time constant change circuit 168 changes a time constant $\tau$ of the start circuit 16 to the time constant for start ($\tau 0$) during the start period for starting the lamp 2. The circuit 168 changes the time constant $\tau$ to the time constant for restart ($\tau 1$) during the restart period for restarting the lamp 2. Because of this, for example as shown in FIG. 1, the circuit 168 is formed of a transistor 168a, capacitor 168b and a resistor 168c. The circuit 168 changes the time constant $\tau$ to $\tau 0$ when the time constant change signal $V_t$ is HIGH, and changes the time constant $\tau$ to $\tau 1$ when $V_t$ is LOW. The $\tau 1$ is calculated by C160×R161 and is set to a value of several ms. The C160 is the capacitance of the capacitor 160, and R161 is the resistance of the resistor 161. The $\tau 0$ is calculated by (C160+C168b)×R161 and is set to a value within a given range larger than $\tau 1$. The C168b is the capacitance of the capacitor 168b.

The operation of the first embodiment is now explained with reference to FIG. 8. At the start time point t10, the time constant change signal $V_t$ of HIGH is supplied to the start circuit 16, and the time constant $\tau$ is set to $\tau 0$. The composite control signal (start control signal) $V_{pwm}$ of HIGH is also supplied to the circuit 16, and the drive control signal $V_{swp}$ of the circuit 16 is set to the minimum voltage corresponding to the sweep start frequency of the drive frequency $f_{dr}$. Accordingly, the drive signal having the sweep start frequency is supplied from the drive circuit 122 to each gate of the FETs 120 and 121, and the inverter circuit 12 operates at the maximum operation frequency $f_{op1}$.

Subsequently, at and after the time point t11 at which the composite control signal (start control signal) $V_{pwm}$ shifts from HIGH to LOW, the voltage across the capacitor 160 sweeps up through the time constant $\tau 0$ and the drive control signal $V_{swp}$ sweeps up from the minimum voltage. Thereby the drive frequency $f_{dr}$ sweeps down and then the operation frequency of the inverter circuit 12 sweeps down from $f_{op1}$ to $f_{op4}$, and therefore the voltage $V_{out}$ applied across the coil 14 rises. The lamp 2 is lit at the voltage $V_{out3}$ before a time point t12 at which the operation frequency reaches $f_{op4}$. At this point, a high-frequency plasma current is generated inside the lamp 2 through the high-frequency electromagnetic field from the coil 14, and the lamp 2 emits ultraviolet rays or visible light.

Subsequently, at and after the time point t13 at which the composite control signal (dimming control signal) $V_{pwm}$ shifts from LOW to HIGH, the drive control signal $V_{swp}$ is returned to the minimum voltage. The composite control signal (dimming control signal) $V_{pwm}$ is also set to a constant value from 100 Hz to several kHz. Accordingly, the inverter circuit 12 again operates at the maximum operation frequency $f_{op1}$ and the lamp 2 is turned off. At the time point t14, the time constant change signal $V_t$ shifts from HIGH to LOW and the time constant $\tau$ is changed to $\tau 1$.

Subsequently, at and after the time point t15 at which the composite control signal (dimming control signal) $V_{pwm}$ shifts from HIGH to LOW, the voltage across the capacitor 160 sweeps up through the time constant $\tau 1$ and the drive control signal $V_{swp}$ sweeps up from the minimum voltage. Thereby the drive frequency $f_{dr}$ sweeps down and then the operation frequency of the inverter circuit 12 sweeps down from $f_{op1}$ to $f_{op4}$, and therefore the voltage $V_{out}$ rises. The lamp 2 is turn on through the voltage $V_{out2}$ before the time point t16 at which the operation frequency reaches $f_{op4}$. Herein, the discharge gas within the lamp when it is restarted maintains energy and therefore the restart voltage $V_{out2}$ becomes lower than the start voltage $V_{out3}$.

Subsequently, at and after the time point t17 at which the signal $V_{pwm}$ shifts from LOW to HIGH, the drive control signal $V_{swp}$ is returned to the minimum voltage. Accordingly, the inverter circuit 12 again operates at the maximum operation frequency $f_{op1}$ and the lamp 2 is turned off. At and after this operation, the same operation is repeated.

In the first embodiment, during each restart period in the dimming mode, the voltage $V_{out}$ can be quickly raised through the time constant for restart $\tau 1$, and therefore the lamp 2 can be quickly restarted and then turned on in response to LOW of the signal $V_{pwm}$.

Moreover, stress on circuits can be reduced (see FIG. 7), because the rise of the voltage $V_{out}$ during the start period can be made gentle through the time constant for start $\tau 0$ and also the start voltage (maximum voltage) $V_{out}$ can be decreased. This advantage was confirmed by an experiment. When the time constant $\tau$ at the time of start was 0.4 ms and was the same as the time constant at the time of restart, the maximum voltage at the time of start was 1.65 kVo-p under the condition that the frequency $f_{pwm}$ of the voltage (pulse width modulation voltage) $V_{pwm}$ was 500 Hz and the operation frequency $f_{op3}$ at the time of start was 135 kHz. When the time constant for start τ0 was 35 ms, the maximum voltage at the time of start was 1.15 kVo-p under the condition. Therefore, the start voltage can be lowered without lowering the restart voltage. In addition, even if a ferrite core is installed, the ferrite core can be hardly saturated during a start period.

Figure 8:
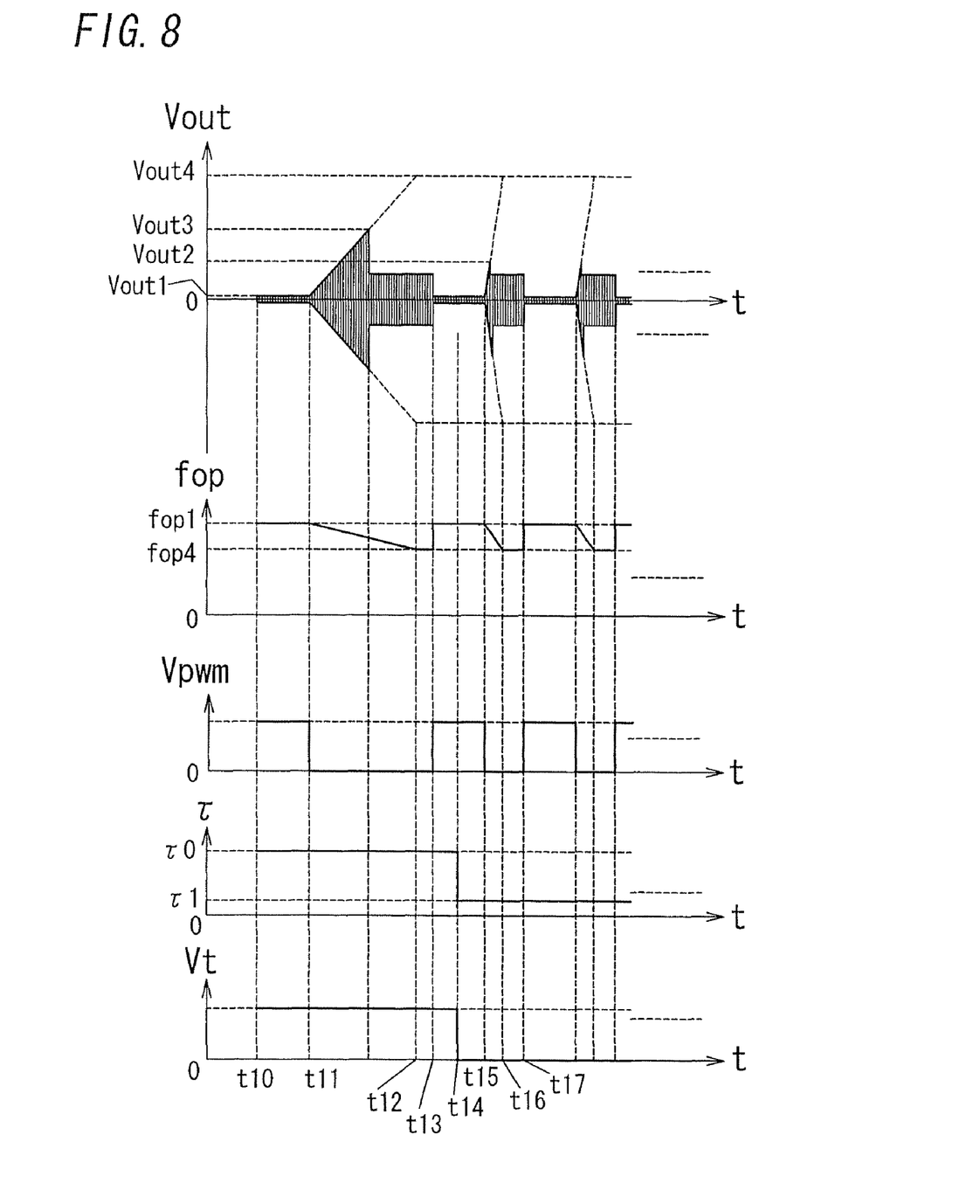
FIG. 8 is a timing diagram showing the operation of the ballast of FIG. 1.

In an alternate embodiment, the inverter circuit periodically stops the output of itself during each HIGH of the composite control signal $V_{pwm}$ (minimum voltage of $V_{swp}$) instead of decreasing the voltage $V_{out}$ to $V_{out1}$ (cf. FIG. 8).

Figure 9:
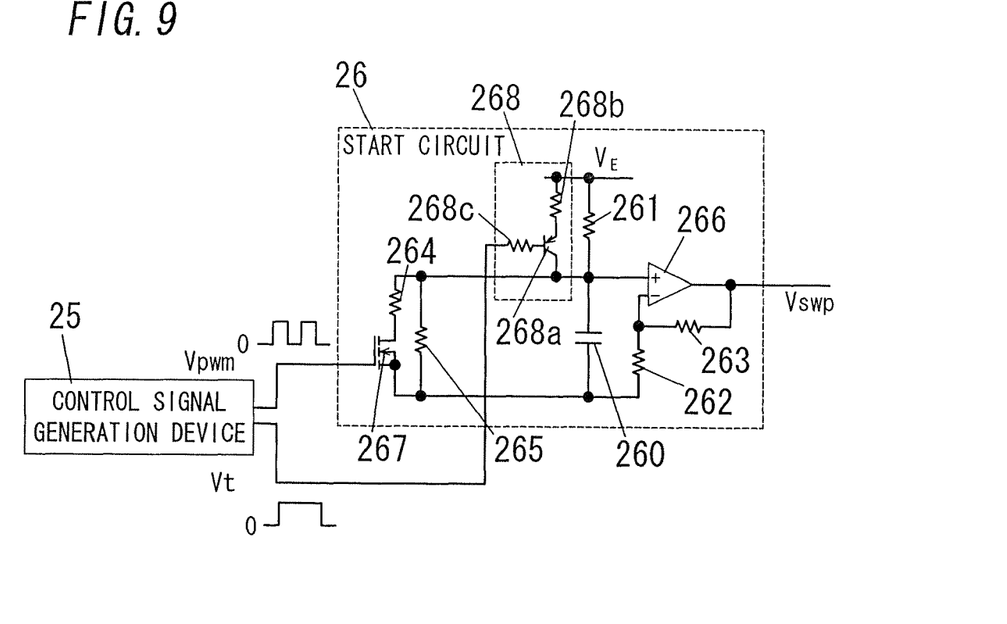
FIG. 9 is a circuit diagram of a control signal generation device and a start circuit in a second embodiment of a dimmable electronic ballast for an electrodeless discharge lamp according to the present invention.

FIG. 9 shows a control signal generation device 25 and a start circuit 26 in a second embodiment of a dimmable electronic ballast for an electrodeless discharge lamp according to the present invention. The ballast in the second embodiment is characterized by the start circuit 26. The circuit 26 comprises a capacitor 260, resistors 261-265, an OP amp 266 and a FET 267 like those of the first embodiment, and also comprises a time constant change circuit 268 different from that of the first embodiment.

The time constant change circuit 268 is formed of a transistor 268a and resistors 268b and 268c. The circuit 268 sets the time constant τ to τ0 when the time constant change signal $V_t$ is HIGH, and changes the time constant τ to τ1 when $V_t$ is LOW. Under the condition that the current between the emitter and base of the transistor 268a is ignorable small, τ1 is calculated by C260×(R261//R268b) and set to a value of several ms. The C260 is the capacitance of the capacitor 260, and R261 and R268b are the resistances of the resistors 261 and 268b, respectively. The τ0 is calculated by C260×R261 and set to a value within a given range larger than τ1.

Figure 10:
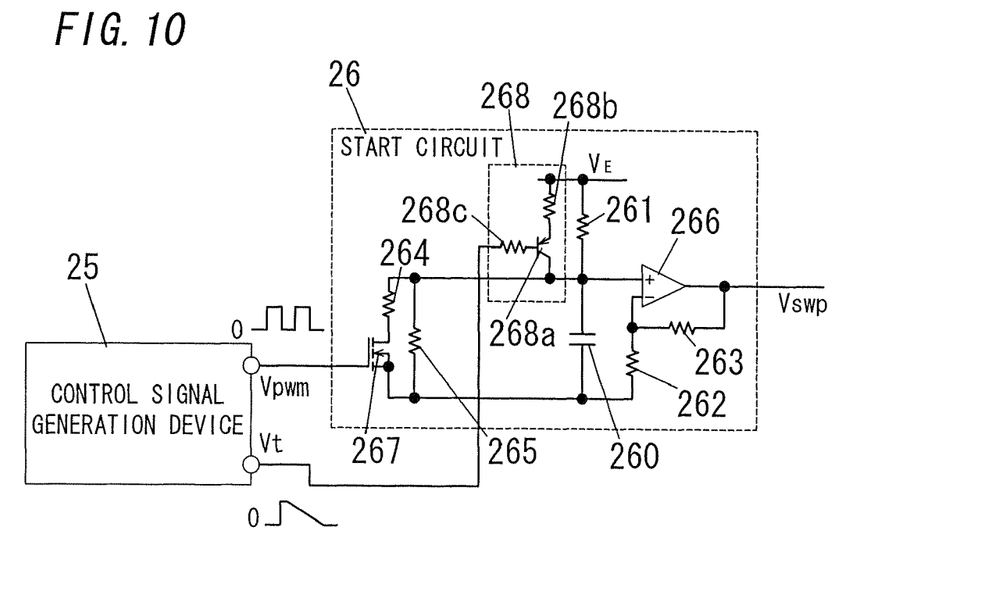
FIG. 10 shows an alternate embodiment.
Figure 11:
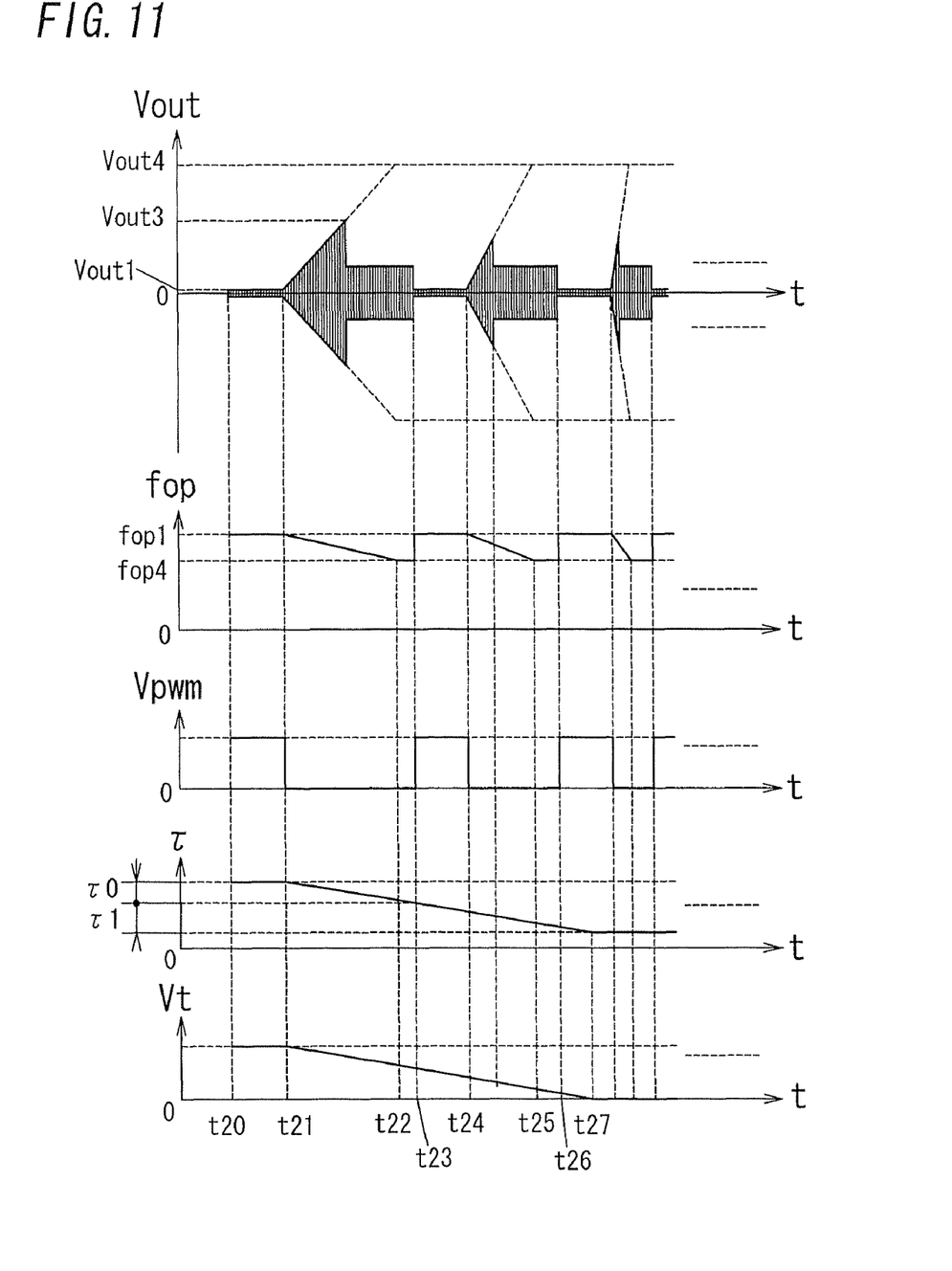
FIG. 11 is a timing diagram showing the operation of the embodiment of FIG. 10.

In an alternate embodiment, as shown in FIGS. 10 and 11, the start circuit 26 continuously sweeps down the time constant for start τ0 and the time constant for restart τ1 each in response to the time constant change signal $V_t$ from the control signal generation device 25. The device 25 sweeps down the signal $V_t$ from the sweep start time point t21 of the start period to, for example, the time point t27. In case of this embodiment, the voltage applied to the non-inverting input terminal of the OP amp 266 does not include the components of the overshoot and undershoot like the second embodiment. Accordingly, the restart voltage can be prevented from becoming excessive owing to such components.

Figure 12:
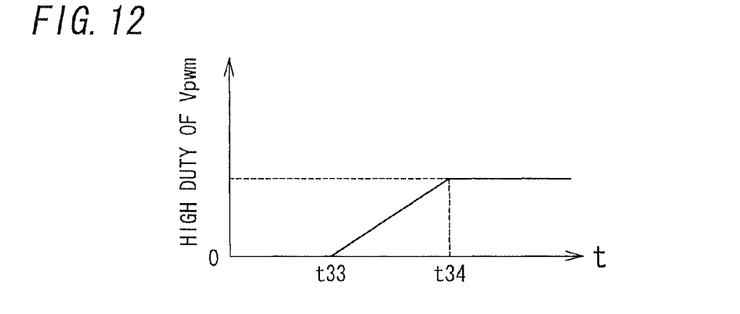
FIG. 12 shows a variable duty on HIGH period of a dimming control signal in a third embodiment of a dimmable electronic ballast for an electrodeless discharge lamp according to the present invention.
Figure 13:
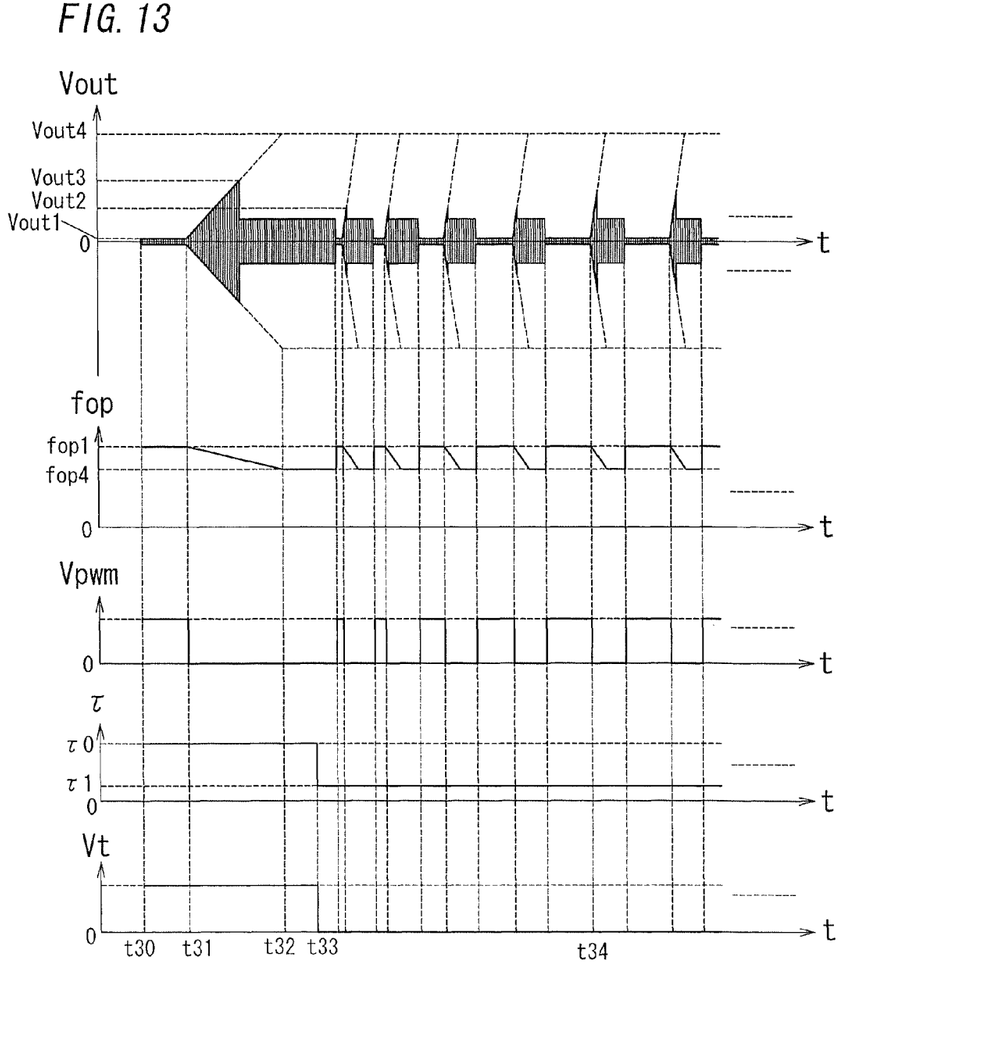
FIG. 13 is a timing diagram showing the operation of the ballast of FIG. 12.

FIGS. 12 and 13 show the operation of a third embodiment of a dimmable electronic ballast for an electrodeless discharge lamp according to the present invention. The ballast in the third embodiment is characterized by a control signal generation device. The control signal generation device increases duty of each HIGH of the dimming control signal included in the composite control signal $V_{pwm}$ from the output time point t33 of the dimming control signal. The duty is increased from zero to a given value at a time point t34. As the duty of HIGH is smaller, a rate of ionized ions remaining in the lamp when it is restarted becomes larger and therefore the maximum voltage at the time of restart gradually rises. The voltage applied to the non-inverting input terminal of the OP amp in the start circuit has the tendency that becomes instable when the time constant is changed. However, the maximum voltage at the time of restart is lowered, and thereby the overvoltage caused by change of the time constant can be suppressed.

Figure 14:
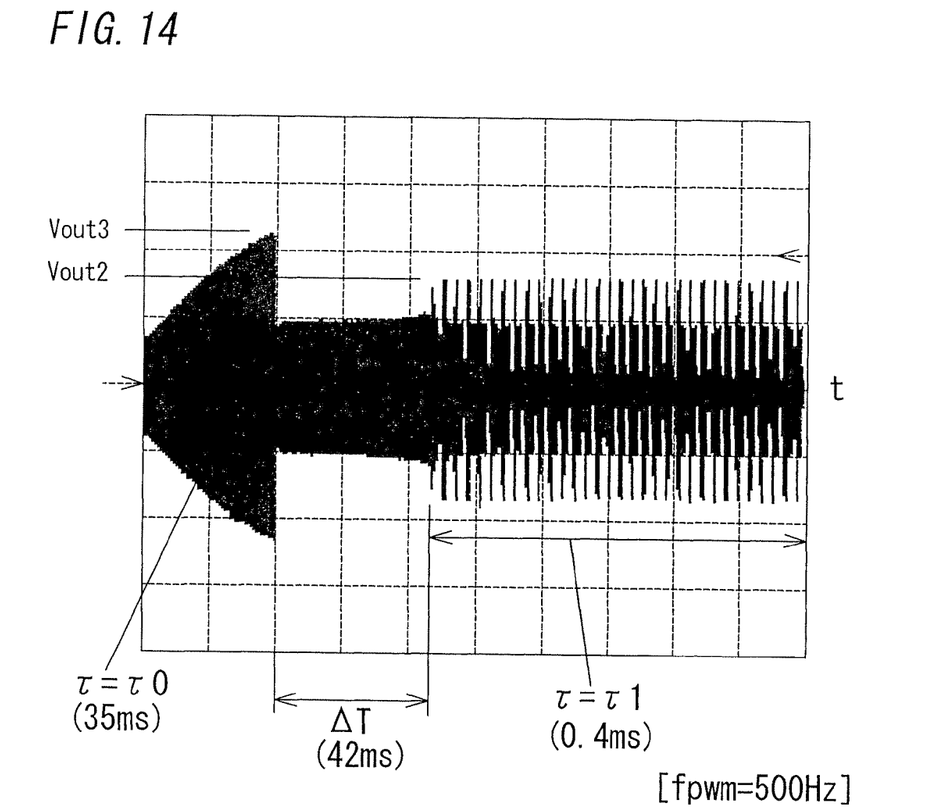
FIG. 14 shows output waves of a fourth embodiment of a dimmable electronic ballast for an electrodeless discharge lamp according to the present invention.

FIG. 14 shows the output waves of a fourth embodiment of a dimmable electronic ballast for an electrodeless discharge lamp according to the present invention. The ballast in the fourth embodiment is characterized by a control signal generation device. The control signal generation device supplies the start circuit with the dimming control signal before a time of 50 ms passes from the time point at which the resonance characteristic of the lamp shifts to the resonance of the lighting mode (second resonance curve LP in FIG. 6). In an example of FIG. 14, the dimming control signal is provided at the time point that 42 ms passes from the time point at which the resonance characteristic shifts to the second resonance curve LP.

A sense of a person who receives light stimulus in the eyes reaches the peak after 50-100 ms from receiving the light stimulus. This phenomenon is known as the Broca-Sulzer effect. In the fourth embodiment, by making ΔT of FIG. 14 shorter than 50 ms, a flicker feel after a start period can be suppressed.

Figure 15:
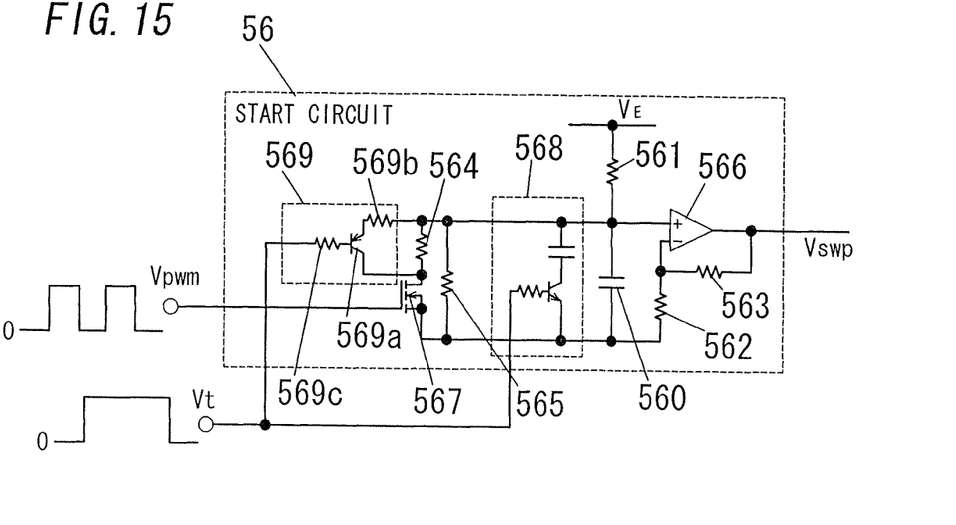
FIG. 15 is a circuit diagram of a start circuit in a fifth embodiment of a dimmable electronic ballast for an electrodeless discharge lamp according to the present invention.
Figure 16:
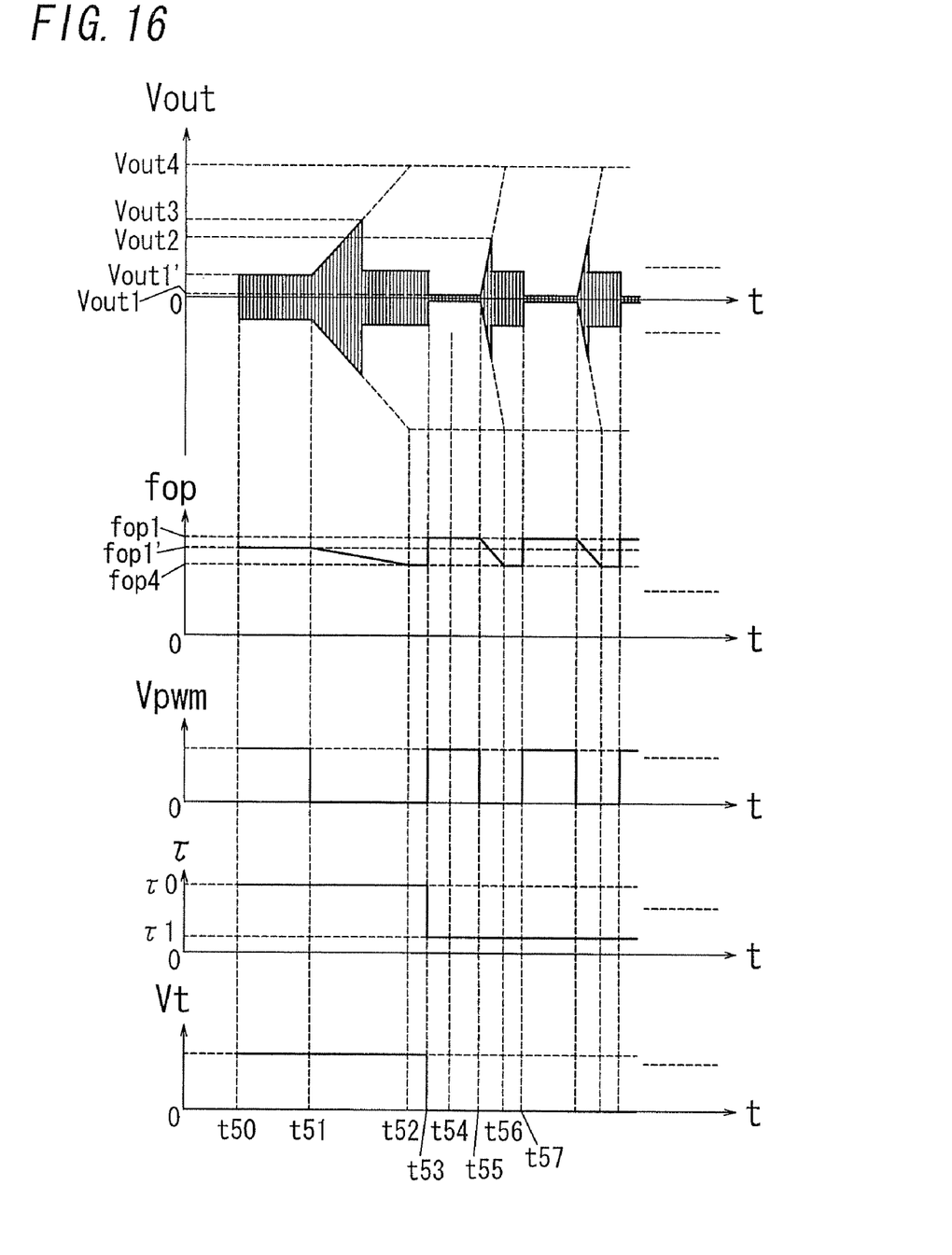
FIG. 16 is a timing diagram showing the operation of the ballast of FIG. 15.

FIG. 15 shows a start circuit 56 in a fifth embodiment of a dimmable electronic ballast for an electrodeless discharge lamp according to the present invention. The circuit 56 comprises a capacitor 560, resistors 561-565, an OP amp 566, a FET 567 and a time constant change circuit 568 like those of the first embodiment, and also further comprises a start voltage change circuit 569.

In response to the time constant change signal $V_t$ from the control signal generation device, the start voltage change circuit 569 causes the operation frequency $f_{op1'}$ immediately before sweeping in the start period to be lower than the operation frequency $f_{op1}$ immediately before sweeping in a restart period. Thereby, the circuit 569 causes the voltage $V_{out1'}$ applied across the coil by the frequency $f_{op1'}$ to be higher than the voltage $V_{out1}$ applied across the coil by the frequency $f_{op1}$. The voltage $V_{out1'}$ is lower than the level when the lamp shifts to arc discharge, and is set to a level for increasing a rate of ionized ions of the discharge gas in the lamp. However, the $V_{out1'}$ may be a level when glow discharge is generated in the lamp.

Accordingly, as shown in an example of FIG. 15, the start voltage change circuit 569 is formed of a transistor 569a and resistors 569b and 569c. The resistance of a parallel circuit (564//565) formed of the resistors 564 and 565 is also set to a value larger than that of 164//165 in the first embodiment. Thereby when the transistor 569a is turned off in response to the time constant change signal $V_t$ of HIGH at the start point t50, the voltage $V_{swp}$ becomes higher than that of the first embodiment and the operation frequency $f_{op}$ is set to $f_{op1'}$. Consequently, the voltage applied across the coil during the period t50-t51 becomes voltage $V_{out1'}$ higher than the $V_{out1}$ of the first embodiment. The resistance of a parallel circuit of 564//565 and the resistor 569b is also set to almost the same value as that of 164//165. Accordingly, when the transistor 569a is turned on in response to the time constant change signal $V_t$ of LOW at the time point t53, the voltage $V_{swp}$ becomes low and an operation frequency $f_{op}$ at the time of turn-off is changed to $f_{op1}$ similar to the first embodiment from the $f_{op1'}$.

In the fifth embodiment, the voltage $V_{out}$ immediately before sweeping down in a start period is raised from $V_{out1}$ to $V_{out1'}$, and thereby capable of storing more energy in the discharge gas in the lamp. Accordingly, the start voltage $V_{out3}$ can be decreased lower than that of the first embodiment and also a start period can be shortened. Furthermore, the saturation of the ferrite core can be more effectively prevented.

Although the present invention has been described with reference to certain preferred embodiments, numerous modifications and variations can be made by those skilled in the art without departing from the true spirit and scope of this invention.

The invention claimed is:

1. A dimmable electronic ballast for an electrodeless discharge lamp, comprising:
    an inverter circuit that, in response to a drive signal having a variable drive frequency, converts the DC power from a DC power supply circuit into the high-frequency power having the operation frequency corresponding to the drive frequency;

a resonance circuit that receives the high-frequency power and then produces high-frequency resonant power based on a resonance characteristic, said resonant power being variable output corresponding to the operation frequency;

an induction coil that receives the high-frequency resonant power and then generates a high-frequency electromagnetic field to apply the electromagnetic field to the electrodeless discharge lamp; and a start circuit having a variable time constant, said start circuit sweeping the drive frequency through a time constant for start or restart so that the voltage applied across the coil by the high-frequency resonant power is raised from voltage lower than start voltage and restart voltage for starting and restarting the lamp to voltage higher than the start voltage and the restart voltage;

wherein the time constant for start during a start period for starting the lamp at the beginning of dimming is larger than the time constant for restart during a restart period for restarting in the dimming period.

2. The dimmable electronic ballast of claim 1, wherein:

the start circuit: receives a dimming control signal that is variable in duty and repeats first and second levels; and, in response to each first level, periodically sweeps the drive frequency through the time constant for restart so that the voltage applied across the coil is raised from the voltage lower than the restart voltage to the voltage higher than the restart voltage; and the lamp is repeatedly turned on and off in accordance with the dimming control signal, and is lit at the dimming rate corresponding to the duty.

3. The dimmable electronic ballast of claim 2, wherein the start circuit periodically changes the drive frequency to a frequency for extinction during each second level of the dimming control signal, said frequency for extinction being a frequency for lowering the voltage applied across the coil to voltage lower than voltage necessary to light the lamp.

4. The dimmable electronic ballast of claim 2, wherein the inverter circuit periodically stops the output of itself during each second level of the dimming control signal.

5. The dimmable electronic ballast of claim 2, wherein the start circuit continuously sweeps down the time constant for start and the time constant for restart.

6. The dimmable electronic ballast of claim 2, wherein the start circuit is connected with a control signal generation device, said control signal generation device supplying the dimming control signal to the start circuit, and also increasing duty of each second level of the dimming control signal from the output time point of the dimming control signal, said duty being increased from zero to a given value.

7. The dimmable electronic ballast of claim 2, wherein the start circuit is connected with a control signal generation device, said control signal generation device supplying the dimming control signal to the start circuit before a time of 50 ms passes from a point in time at which the resonance characteristic of the lamp shifts to the resonance of a lighting mode.

8. The dimmable electronic ballast of claim 2, wherein: a first operation frequency immediately before sweeping in the start period is lower than a second operation frequency immediately before sweeping in the restart period; and the voltage applied across the coil by the first operation frequency is higher than the voltage applied across the coil by the second operation frequency.

9. A luminaire comprising the dimmable electronic ballast of claim 2, wherein the luminaire is equipped with said lamp.

* * * * *